US012764568B2

(12) United States Patent
Uniyal

(10) Patent No.: US 12,764,568 B2
(45) Date of Patent: Oct. 13, 2026

(54) MONITORING A FRONTHAUL INTERFACE OF A NETWORK

(71) Applicant: Boost SubscriberCo L.L.C., Englewood, CO (US)

(72) Inventor: Manish Uniyal, Parker, CO (US)

(73) Assignee: Boost SubscriberCo L.L.C., Englewood, CO (US)

( * ) Notice: Subject to any disclaimer, the term of this patent is extended or adjusted under 35 U.S.C. 154(b) by 570 days.

(21) Appl. No.: 18/144,758

(22) Filed: May 8, 2023

(65) Prior Publication Data

US 2024/0381129 A1 Nov. 14, 2024

(51) Int. Cl.
*H04W 24/04* (2009.01)
*H04L 41/0654* (2022.01)

(52) U.S. Cl.
CPC ......... *H04W 24/04* (2013.01); *H04L 41/0654* (2013.01)

(58) Field of Classification Search
None
See application file for complete search history.

(56) References Cited

U.S. PATENT DOCUMENTS

| | | | | |
|---|---|---|---|---|
| 2019/0245740 | A1* | 8/2019 | Kachhla | H04L 41/045 |
| 2020/0220650 | A1* | 7/2020 | Cheng | H04L 41/34 |
| 2020/0252889 | A1* | 8/2020 | Anand | H04W 56/001 |
| 2022/0123854 | A1 | 4/2022 | Cederholm et al. | |
| 2022/0338105 | A1* | 10/2022 | Kopperla | H04W 48/18 |
| 2024/0154857 | A1 | 5/2024 | Ogihara et al. | |
| 2024/0357620 | A1* | 10/2024 | Tang | H04W 16/10 |
| 2025/0048479 | A1* | 2/2025 | Lins de Medeiros | H04W 24/04 |

FOREIGN PATENT DOCUMENTS

| | | |
|---|---|---|
| WO | WO 2022/190329 | 9/2022 |

OTHER PUBLICATIONS

Intel, eCPRI Intel FPGA IP User Guide, Feb. 24, 2023 (Year: 2023).*

International Search Report and Written Opinion in International Appln. No. PCT/US2024/028355, mailed on Sep. 3, 2024, 14 pages.

[No Author Listed], "Common Public Radio Interface: eCPRI Interface Specification," eCPRI Specification V2.0, May 10, 2019, 109 pages.

International Preliminary Report on Patentability in International Appln. No. PCT/US2024/028355, mailed on Nov. 20, 2025, 10 pages.

* cited by examiner

*Primary Examiner* — Angela Nguyen
(74) *Attorney, Agent, or Firm* — Lowenstein Sandler LLP

(57) ABSTRACT

Methods, systems, and apparatus, including computer programs encoded on computer storage media, for monitoring a fronthaul interface. One of the methods includes receiving one or more messages exchanged between two internal nodes of a base station of an open radio access network (Open-RAN) through a fronthaul interface of the Open-RAN, the fronthaul interface being an interface between one or more radio units (RUs) and one or more distributed units (DUs) of the Open-RAN, determining, based on the one or more messages, that an event affecting an operation status of the fronthaul interface has occurred, determining one or more actions to account for the operation status of the fronthaul interface, and generating a signal configured to trigger the one or more actions.

15 Claims, 6 Drawing Sheets

500

MONITORING A FRONTHAUL INTERFACE OF A NETWORK

BACKGROUND

Wireless communication networks allow user devices to connect to the internet and other devices. The wireless communication networks can include radio access network (RAN) resources that transmit data with the user devices and other network nodes.

SUMMARY

In general, one innovative aspect of the subject matter described in this specification can be embodied in methods that include the actions of receiving, by at least one processing device, one or more messages exchanged between two internal nodes of a base station of an open radio access network (Open-RAN) through a fronthaul interface of the Open-RAN, the fronthaul interface being an interface between one or more radio units (RUs) and one or more distributed units (DUs) of the Open-RAN. The methods include determining, by the at least one processing device based on the one or more messages, that an event affecting an operation status of the fronthaul interface has occurred, determining, by the at least one processing device, one or more actions to account for the operation status of the fronthaul interface, and generating, by the at least one processing device, a signal configured to trigger the one or more actions. Other embodiments of this aspect include corresponding computer systems, apparatus, and computer programs recorded on one or more computer storage devices, each configured to perform the actions of the methods.

The foregoing and other embodiments can each optionally include one or more of the following features, alone or in combination. In particular, one embodiment includes all the following features in combination.

In some implementations, the fronthaul interface supports the enhanced common public radio interface (eCPRI) protocol.

In some implementations, the base station is a gNodeB (gNB) of a 5G network or an eNodeB of a 4G network.

In some implementations, the two internal nodes include an eCPRI Radio Equipment Control (eREC) node and an eCPRI Radio Equipment (eRE) node.

In some implementations, performing the one or more actions includes resetting the eCPRI.

In some implementations, determining the one or more actions to account for the operation status of the fronthaul interface includes determining which of the one or more RUs or one or more DUs is causing the fault, and triggering the one or more actions on the one or more RUs or one or more DUs causing the fault.

In some implementations, determining the one or more actions to account for the operation status of the fronthaul interface includes predicting a disruption to the fronthaul interface, wherein the one or more actions include a proactive action before the predicted disruption.

In some implementations, triggering the one or more actions includes clearing at least one alarm on the fronthaul interface.

In some implementations, determining that an event affecting an operation status of the fronthaul interface has occurred includes determining whether to prioritize each message of the one or more messages based on a type of the message, the type of the message determined based on a first data field of the message, and determining the operating status of the fronthaul interface based on second data fields of the prioritized messages.

In some implementations, the one or more messages include eCPRI message type 7 and the first data field includes an event type data field.

In some implementations, determining whether to prioritize each message of the one or more messages includes determining whether the event type data field of the eCPRI message type 7 includes a fault indication, and in response to determining that the event type data field of the eCPRI message type 7 includes a fault indication, determining to prioritize the message.

In some implementations, determining the one or more actions to account for the operation status of the fronthaul interface includes determining a number of occurrences of the event affecting the operation status of the fronthaul interface based on the second data fields of the prioritized messages, and determining whether the number of occurrences of the event exceeds a threshold value, wherein the one or more actions are performed in response to the number of occurrences of the event exceeding the threshold value.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This document describes technology for monitoring a fronthaul interface of a network, and taking appropriate action when needed. The network can include an open radio access network (O-RAN). O-RAN (Open-RAN) includes an open, virtualized architecture which can use (e.g., be executed on) generic hardware and/or software that facilitate interoperability. O-RAN allows interoperability between network equipment supported by different vendors. An O-RAN fronthaul interface connects open distributed units (O-DU) and open radio units (O-RU) from different vendors (e.g., hardware and/or software providers and/or hosts). For example, an O-RAN fronthaul interface can support traffic through any vendor or combination of vendors (as opposed to a proprietary interface, which may be closed and only support one vendor). Events affecting the operability of the fronthaul interface can affect multiple elements of the network.

A monitoring system can process information exchanged between elements of the fronthaul interface of the O-RAN network to identify status information (e.g., faults and/or alarms on particular elements). The monitoring system can use the status information to take proactive actions or remedial actions to improve the health of the network. For example, proactive actions can include restarting an interface of the O-RAN network based on detecting a predetermined number of errors. In some examples, remedial actions can include identifying and fixing an element after the element goes offline. The monitoring system can monitor messages transmitted and received by the O-RU and O-DU on the fronthaul interface. These messages can include alerts, problems, and events transmitted between the O-RU and O-DU. The monitoring system can analyze the transmission history to determine if the O-RU or the O-DU caused the network to go down, and take appropriate action to fix the network.

Figure 1:
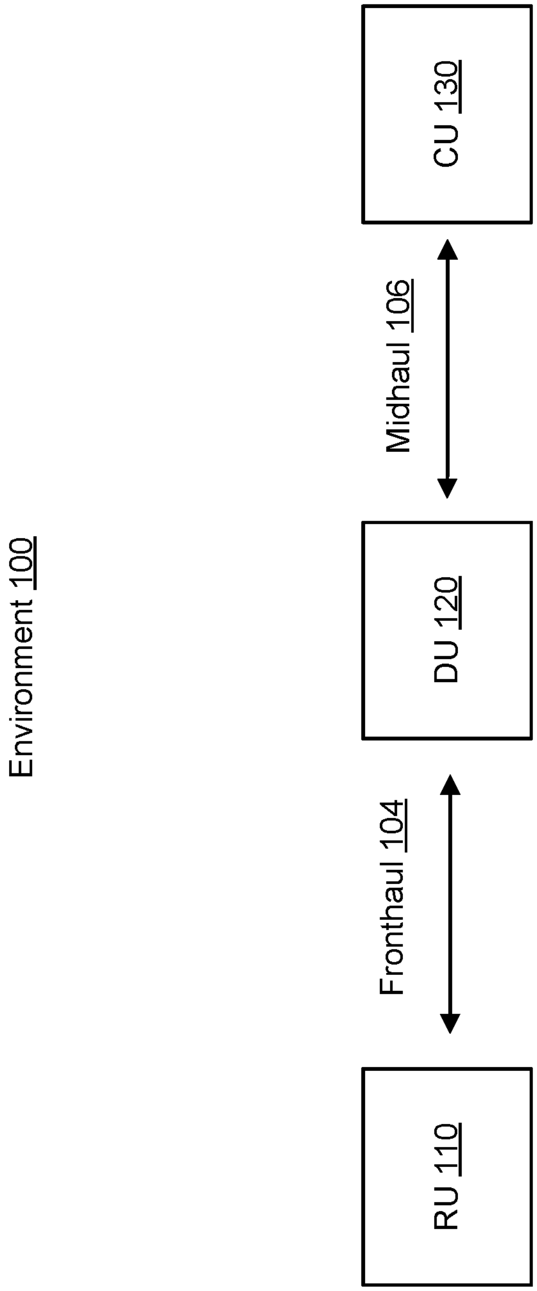
FIG. 1 is an example environment for a RAN infrastructure.

FIG. 1 is an example environment 100 for an O-RAN infrastructure. The environment 100 includes radio unit (RU) 110, distributed unit (DU) 120, and centralized unit (CU) 130. The RU 110, DU 120, and/or CU 130 can be part of a base station (e.g., eNB, gNB) which, for a 5G O-RAN, is located between a user equipment (UE) and the core of the network (also referred to as the next-generation core (NGC) and/or 5G core (5GC)). In other implementations, for example in 4G long term evolution (LTE) networks, the RU 110, DU 120, and/or CU 130 can be located between a UE and an evolved packet core (EPC). The DU 120 and CU 130 can be virtualized (e.g., executed as modules on a cloud-computing environment). The RU 110 can be located on the end of the RAN infrastructure and connect to UE. For example, the RU 110 can include a physical antenna and can wirelessly connect to UE. The RU 110 can connect to DU 120 through fronthaul interface 104. The DU 120 can connect to CU 130 through a midhaul interface 106.

The fronthaul interface 104 can include a common public radio interface (CPRI) connecting a radio equipment control (REC) to one or more radio equipment (RE). CPRI can define publicly available specifications for the key internal interface of radio base stations (e.g., GNBs). The CPRI can be an enhanced CPRI (eCPRI) connecting one or more eCPRI REC (eREC) and one or more eCPRI RE (eRE). Compared to CPRI, eCPRI can make it possible to decrease the data rate demands between eREC and eRE via a flexible functional decomposition while limiting the complexity of the eRE.

Figure 2:
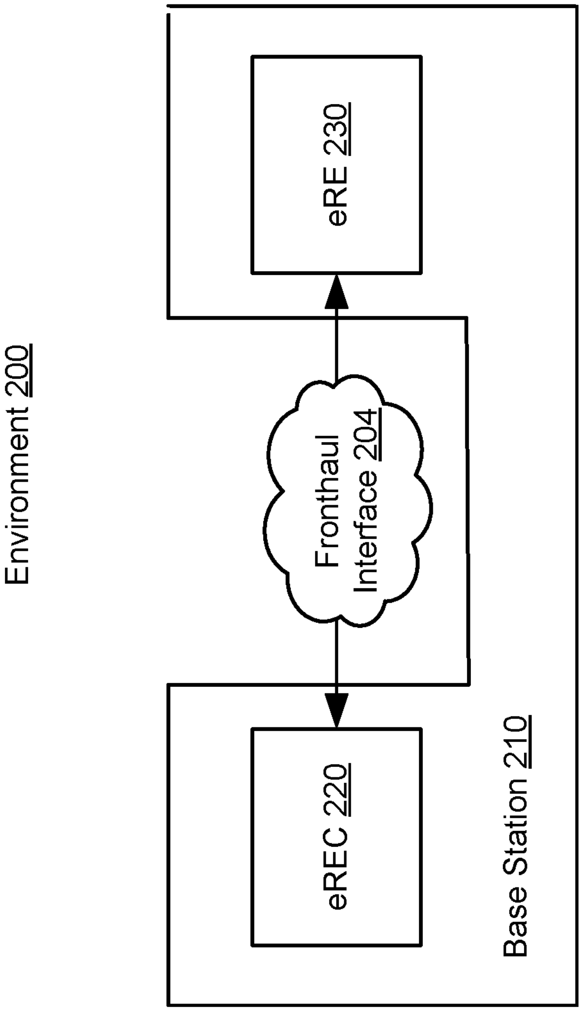
FIG. 2 is an example environment for a RAN infrastructure.

FIG. 2 is an example environment 200 for a RAN infrastructure. The environment 200 includes base station 210. For example, the base station 210 can include an eCPRI node, an eNB, and/or a gNB. Base station 210 includes eREC 220 and eRE 230. The eREC 220 and the eRE 230 can be connected through fronthaul interface 104. In some implementations, the base station 210 can include additional eCPRI nodes. In some implementations, the eREC 220 and the eRE 230 are physically separated (e.g., the eRE 230 is kept near a physical antenna). Different functional decompositions can be selected between the eREC 220 and the eRE 230 for a specific implementation.

The eREC 220 can send commands to control the base station 210 and can include a DU and a CU as eREC elements (e.g., a DU that is the same or similar to DU 120 of FIG. 1, a CU that is the same or similar to CU 130 of FIG. 1). The eREC 220 can raise alarms and control functionality of the eRE 230 through the eCPRI interface. The eRE 230 can include physical equipment (e.g., an antenna) and an RU as an eRE element (e.g., an RU that is the same or similar to RU 110 of FIG. 1).

The eREC 220 and the eRE 230 can include hardware or software components within the base station 210. For example, each of the eREC 220 and the eRE 230 alone may not constitute a full eCPRI node. All of the functionality of the eRE 230 can be reported to the eREC 220. Traffic on the fronthaul interface 204 can include control commands and forwarded traffic. All of the traffic received at the eRE 230 from UEs (e.g., data transmissions, voice transmissions) can be forwarded through the fronthaul interface 204.

The fronthaul interface 204 can include three protocol planes: a control and management plane, a user plane, and a synchronization plane. A control and management plane can be used for the control and management data flow for the operation, administration and maintenance of the nodes. For example, faults and/or notifications related to an eCPRI node, such as temperature faults, power supervision, can be sent via the control and management plane. The user plane can cover three data flows. A first data flow can be transferred from the base station 210 to the UE and vice versa. The first data flow can include any data from the UE (e.g., voice, data). A second data flow of the user plane can include real time control data related to the first data flow (e.g., control data related to UE). A third data flow can include other eCPRI flows not covered by other protocol planes/flows (e.g., timing information). The synchronization plane can include a data flow for synchronization and timing information between nodes (e.g., timing information between the eREC 220 and the eRE 230 so they can be synchronized).

The fronthaul interface 204 may experience problems during the course of operation. For example, the fronthaul interface 204 may go down because of errors on the elements of the fronthaul interface 204. When different vendors support the different elements (e.g., a first vendor supports a RU and a second vendor supports a DU), it can be difficult to determine what errors occur on which elements. Without the advantage of the technology described herein, the individual elements may only be able to detect that there is a problem. The elements of the fronthaul interface 204 may not be able to determine the root causes of problems on the fronthaul interface 204.

The base station 210 can monitor the fronthaul interface 204 by using user plane messages. For example, the base station 210 can monitor the message types supported by eCPRI. Different messages types can be transmitted using the fronthaul interface 204. These messages can include alerts, problems, and events transmitted between a RU and DU. The base station 210 can capture relevant alarm indications and/or events between the RU and DU. The captured data can provide a history of the fronthaul interface 204 before the network goes down. The base station 210 can use the history to determine the elements that need to be fixed. The base station 210 can determine an action to perform based on the history. For example, the base station 210 can clear an alarm on the fronthaul interface 204. In some implementations, the base station 210 can contact the correct vendor to fix the problem. For example, all of the RUs may be supported by one vendor and all DUs may be supported by another vendor. The base station 210 can analyze the transmission history to determine if a RU or a DU caused the network to go down, and take appropriate action to fix the network. In some implementations, traffic on the fronthaul interface 204 can switch to a different element if an element from a specific vendor goes down.

Figure 3:
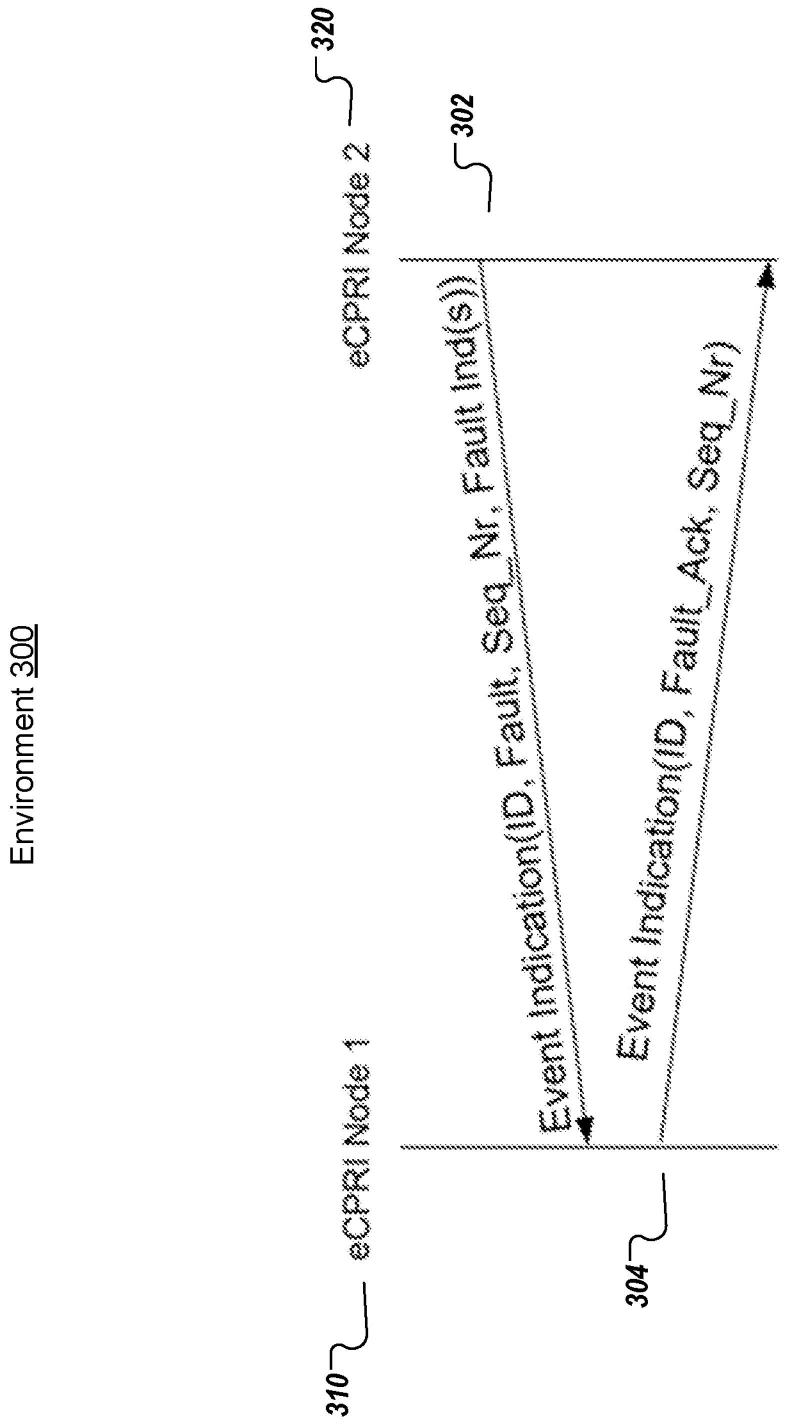
FIG. 3 is an example environment for monitoring a fronthaul interface.

FIG. 3 is an example environment 300 for monitoring a fronthaul interface. The environment 300 includes eCPRI node 310 (e.g., a RU that is the same or similar to RU 110 of FIG. 1) and eCPRI node 320 (e.g., a DU that is the same or similar to DU 120 of FIG. 1). The eCPRI node 310 and eCPRI node 320 can be connected through an eCPRI interface. A monitoring system can monitor messages transmitted through the eCPRI interface. The eCPRI node 320 can transmit event indication message 302 (e.g., message type 7) to the eCPRI node 310 through the eCPRI interface. The eCPRI node 310 can transmit event indication message 304 to the eCPRI node 320 through the eCPRI interface.

Event indication messages can be used when either side (e.g., eCPRI node 310 or eCPRI node 320) of the protocol indicates to the other end that an event has occurred. An event can include a raised fault, a ceased fault, or a notification. Transient faults can be indicated with a notification. Faults and/or notifications sent on the eCPRI level can be relevant to the eCPRI services. For example, when there are faults in the user plane processing and/or power usage fault situations, the faults and notifications sent on the eCPRI can be related to user data processing. Event indications can include ID, the fault, and the sequence number. An event indication can contain either one or more faults, or one or more notifications. For example, faults and notifications may not be mixed in the same event indication message.

Figure 4:
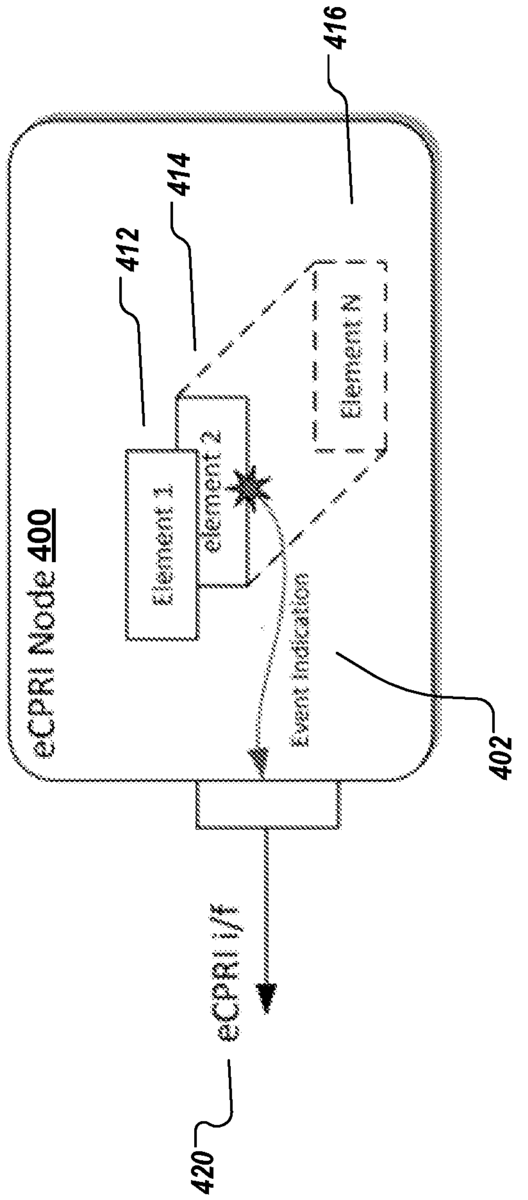
FIG. 4 is an example eCPRI node.

FIG. 4 is an example eCPRI node 400. The eCPRI node 400 can include N elements including element 412, element 414, and element 416. The element 414 can generate an event indication 402. The event indication 402 can associate a fault with the element 414. The eCPRI node 400 can transmit the event indication 402 through eCPRI interface (i/f) 420. In some implementations, an event indication can be associated with the eCPRI node 400, and a predefined element ID number can be used (e.g., 0xFFFF). The event indication message can be sent from an eCPRI node at any time. A synchronization request procedure can be defined for a consistency check. The procedure consistency check can synchronize the requester with the current status of active faults. In some implementations, transient faults may not be synchronized.

The eCPRI node 400 can monitor a fronthaul interface by decoding the message type #7 format content according to eCPRI specification v2.0. For example, the eCPRI node 400 can decode the first eleven bytes of the message according to table 1 below.

TABLE 1

| Byte | Usage | |
|---|---|---|
| 0 | Event ID | |
| 1 | Event Type | |
| 2 | Sequence Number | |
| 3 | Number of Faults/Notification | |
| 4 | Element ID #1 | |
| 5 | | |
| 6 | Raise/Cease #1 | Fault/Notif#1 MSB |
| 7 | FaulUNotif#1 LSB | |
| 8 | Additional Information #1 | |
| 9 | | |
| 10 | | |
| 11 | | |

The messages can include an event ID. The event ID is a 1-byte value set by the transmitter of an event indication or a synchronization request to enable identification of the acknowledge response.

The messages can include an event type. The event type can include one of the five types. For example, the event type can include one of the five types according to table 2 below.

TABLE 2

| Event Type | Description |
|---|---|
| 0x00 | Fault(s) Indication |
| 0x01 | Fault(s) Indication Acknowledge |
| 0x02 | Notification(s) Indication |
| 0x03 | Synchronization Request |
| 0x04 | Synchronization Acknowledge |
| 0x05 | Synchronization End Indication |
| 0x06 . . . 0xFF | Reserved |

The messages can include a number of faults and/or notifications. The number of faults and/or notifications can include a number of fault indications or notifications attached in the same message.

The messages can include an element ID according to table 3 below.

TABLE 3

| Element ID Number | Usage |
|---|---|
| 0x000 . . . 0xFFFE | Vendor specific usage |
| 0xFFFF | A fault or notification applicable for all Elements i.e. the node |

The messages can include a raise or cease. The raise or cease can be included as the first four bits in the same byte as the fault or notification number. The raise or cease can be used according to table 4 below.

TABLE 4

| Raise/Cease | Description |
|---|---|
| 0x0 | Raise a fault |
| 0xl | Cease a fault |
| 0X2 . . . 0xF | Reserved |

The messages can include a fault or notification number. The fault or notification number can include a 12-bit number, divided between 2 bytes, indicating a fault or notification. The fault or notification number can be used according to table 5 below.

TABLE 5

| Fault Indication and Notification Numbers | Usage |
|---|---|
| 0x000 . . . 0x3FF | eCPRI reserved Faults |
| 0x400 . . . 0x7FF | eCPRI reserved Notifications |
| 0x800 . . . 8xFFF | Vendor Specific Fault Indications and Notifications |
| eCPRI Faults and Notifications | |
| 0x000 | General Userplane HW Fault |
| 0x001 | General Userplane SW Fault |
| 0x002 . . . 0x3FF | eCPRI reserved |
| 0x400 | Unknown message type received |
| 0x401 | Userplane data buffer underflow |
| 0x402 | Userplane data buffer overflow |
| 0x403 | Userplane data arrived too early |
| 0x404 | Userplane data received too late |
| 0x405 . . . 0x7FF | eCPRI reserved |

The messages can include additional information regarding the fault or notification for vendor specific usage.

The eCPRI node 400 can monitor the fronthaul interface using transmitted messages. The eCPRI node 400 can take an action based on the transmitted messages. The eCPRI node 400 can read the transmitted messages using the eCPRI message type #7 format. The eCPRI node 400 can read and parse the Event ID, Event Type, Number of faults, Element ID, Raise/cease, and Fault/Notification numbers from the message format.

The eCPRI node 400 can set a priority and notification based on the event type and publish the event type with the element ID using the fields parsed from the message. Messages can be prioritized based on the event type. For example, messages with an event type of 0x00 corresponding to a fault indication can be prioritized over other messages. In some examples, messages with an event type of 0x03 corresponding to a synchronization request can be prioritized over other messages. In some implementations, the eCPRI node 400 can maintain a count of occurrences of messages with the prioritized event type (e.g., within an 18 or 24 hour period). The eCPRI node 400 can trigger an action when the occurrences of messages exceed a threshold value. The eCPRI node 400 can determine an event type to prioritize based on the status of the network. In some implementations, the action can include determining (e.g., recommending) whether to raise a fault or rinse a fault based on the Raise/Cease byte ID.

The eCPRI node 400 can generate a report based on the fields parsed from messages. The eCPRI node 400 can publish a fault indication or notification based on the faults and notifications of the message. The eCPRI node 400 can publish a report or dashboard for monitoring the fronthaul interface. For example, eCPRI node 400 can generate a daily report based on the messages transmitted during a time period (e.g., 24 hours, a split of 6 and 18 hours). The report can include whether a same exception occurred multiple times within a day or during consecutive days.

The eCPRI node 400 can trigger an action based on the messages. For example, predictive forecasting can be used to take proactive action before the fronthaul interface is impacted. The action can include clearing alarms and/or resetting the fronthaul interface during a maintenance window. The alarms and events can include clocks (e.g., internal, external, gps level measurement in dBm), bit rate (bps) and deviation (ppm) measurement, alarm and/or error detection (e.g., signal loss, pattern error), unframed and framed per measurement, and link status monitoring.

Figure 5:
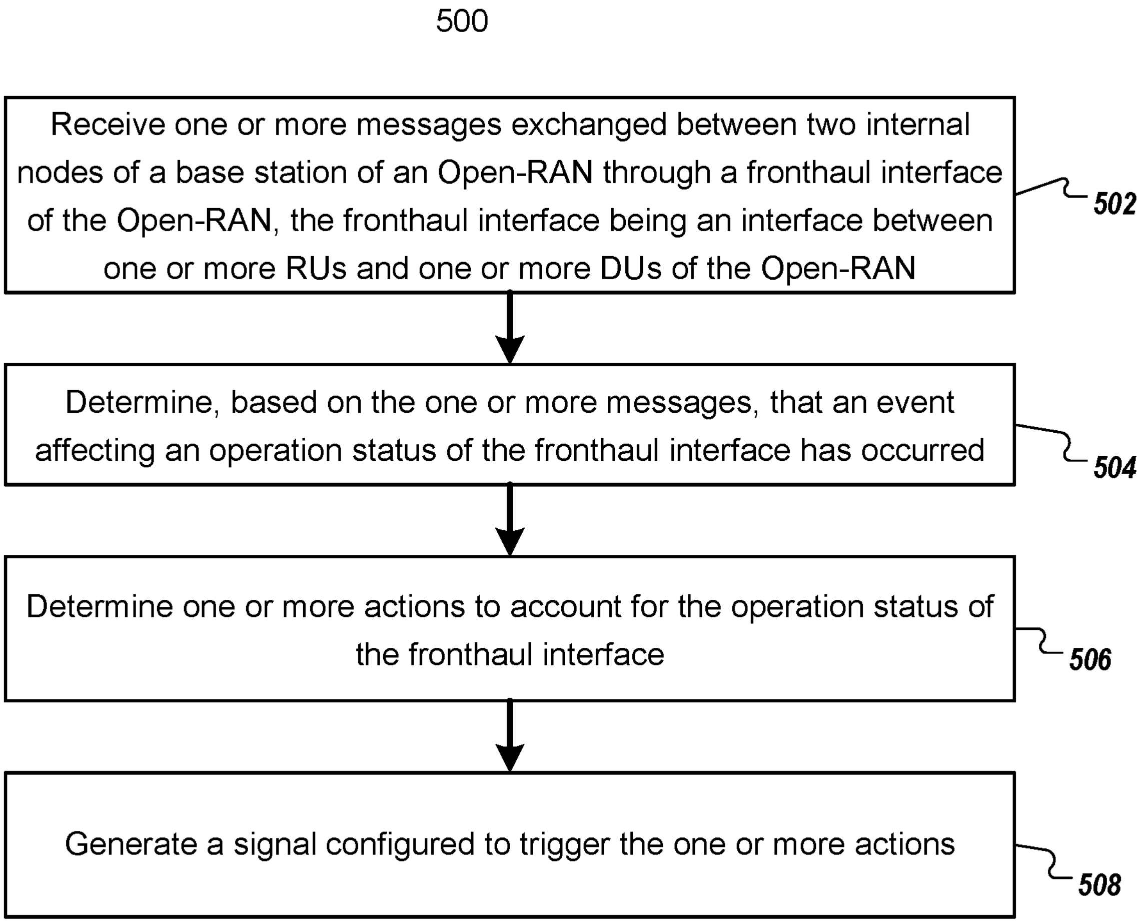
FIG. 5 is a flow diagram of an example process for monitoring a fronthaul interface.

FIG. 5 is a flow diagram of an example process 500 for monitoring a fronthaul interface. For clarity of presentation, the description that follows generally describes process 500 in the context of the other figures in this description. For example, the process 500 can be used by a base station, e.g., the base station 210 of FIG. 2, or an eCPRI node, e.g., the eCPRI node 400 of FIG. 4. It will be understood that process 500 can be performed, for example, by any suitable system, environment, software, hardware, or a combination of systems, environments, software, and hardware, as appropriate. In some implementations, various steps of process 500 can be run in parallel, in combination, in loops, or in any order.

At 502, method 500 involves receiving one or more messages exchanged between two internal nodes of a base station of an Open-RAN through a fronthaul interface of the Open-RAN, the fronthaul interface being an interface between one or more RUs and one or more distributed units (DUs) of the Open-RAN.

At 504, method 500 involves determining, based on the one or more messages, that an event affecting an operation status of the fronthaul interface has occurred.

At 506, method 500 involves determining one or more actions to account for the operation status of the fronthaul interface.

At 508, method 500 involves generating a signal configured to trigger the one or more actions.

Figure 6:
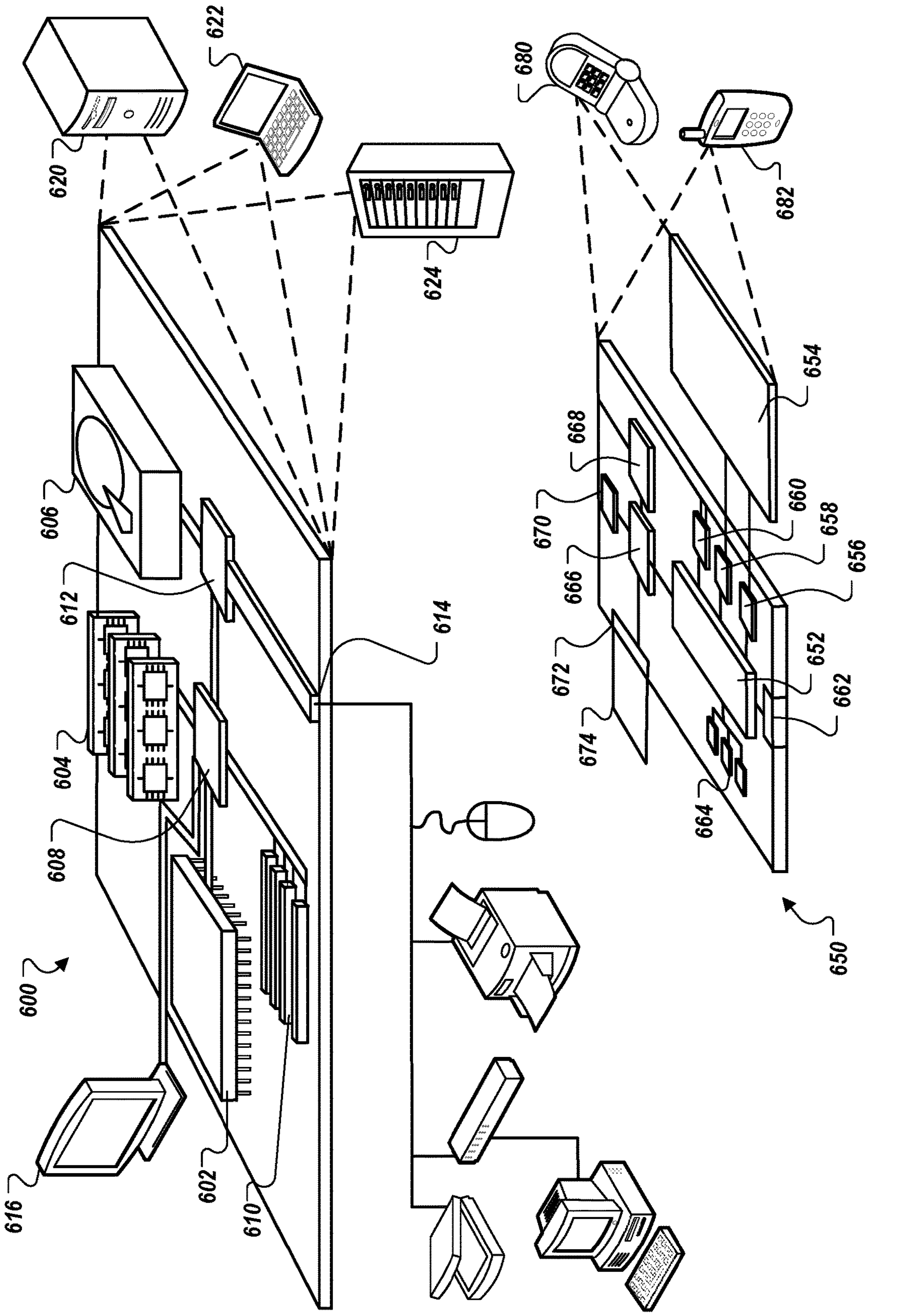
FIG. 6 is a block diagram of a computing system that can be used in connection with computer-implemented methods described in this specification.

FIG. 6 shows an example of a computing device 600 and a mobile computing device 650 (also referred to herein as a wireless device) that are employed to execute implementations of the present disclosure. The computing device 600 is intended to represent various forms of digital computers, such as laptops, desktops, workstations, personal digital assistants, servers, blade servers, mainframes, and other appropriate computers. The mobile computing device 650 is intended to represent various forms of mobile devices, such as personal digital assistants, cellular telephones, smartphones, AR devices, and other similar computing devices. The components shown here, their connections and relationships, and their functions, are meant to be examples only, and are not meant to be limiting. The computing device 600 and/or the mobile computing device 650 can form at least a portion of the application installation environment described above. For example, a computing device 600, or a portion thereof, can be used to implement the RU 110, the DU 120, and/or the CU 130 described with reference to FIG. 1, of the base station 210 described with reference to FIG. 2.

The computing device 600 includes a processor 602, a memory 604, a storage device 606, a high-speed interface 608, and a low-speed interface 612. In some implementations, the high-speed interface 608 connects to the memory 604 and multiple high-speed expansion ports 610. In some implementations, the low-speed interface 612 connects to a low-speed expansion port 614 and the storage device 606. Each of the processor 602, the memory 604, the storage device 606, the high-speed interface 608, the high-speed expansion ports 610, and the low-speed interface 612, are interconnected using various buses, and may be mounted on a common motherboard or in other manners as appropriate. The processor 602 can process instructions for execution within the computing device 600, including instructions stored in the memory 604 and/or on the storage device 606 to display graphical information for a graphical user interface (GUI) on an external input/output device, such as a display 616 coupled to the high-speed interface 608. In other implementations, multiple processors and/or multiple buses may be used, as appropriate, along with multiple memories and types of memory. In addition, multiple computing devices may be connected, with each device providing portions of the necessary operations (e.g., as a server bank, a group of blade servers, or a multi-processor system).

The memory 604 stores information within the computing device 600. In some implementations, the memory 604 is a volatile memory unit or units. In some implementations, the memory 604 is a non-volatile memory unit or units. The memory 604 may also be another form of a computer-readable medium, such as a magnetic or optical disk.

The storage device 606 is capable of providing mass storage for the computing device 600. In some implementations, the storage device 606 may be or include a computer-readable medium, such as a floppy disk device, a hard disk device, an optical disk device, a tape device, a flash memory, or other similar solid-state memory device, or an array of devices, including devices in a storage area network or other configurations. Instructions can be stored in an information carrier. The instructions, when executed by one or more processing devices, such as processor 602, perform one or more methods, such as those described above. The instructions can also be stored by one or more storage devices, such as computer-readable or machine-readable mediums, such as the memory 604, the storage device 606, or memory on the processor 602.

The high-speed interface 608 manages bandwidth-intensive operations for the computing device 600, while the low-speed interface 612 manages lower bandwidth-intensive operations. Such allocation of functions is an example only. In some implementations, the high-speed interface 608 is coupled to the memory 604, the display 616 (e.g., through a graphics processor or accelerator), and to the high-speed expansion ports 610, which may accept various expansion cards. In the implementation, the low-speed interface 612 is coupled to the storage device 606 and the low-speed expansion port 614. The low-speed expansion port 614, which may include various communication ports (e.g., Universal Serial Bus (USB), Bluetooth, Ethernet, wireless Ethernet) may be coupled to one or more input/output devices. Such input/output devices may include a scanner, a printing device, or a keyboard or mouse. The input/output devices may also be coupled to the low-speed expansion port 614 through a network adapter. Such network input/output devices may include, for example, a switch or router.

The computing device 600 may be implemented in a number of different forms, as shown in the FIG. 6. For example, it may be implemented as a standard server 620, or multiple times in a group of such servers. In addition, it may be implemented in a personal computer such as a laptop computer 622. It may also be implemented as part of a rack server system 624. Alternatively, components from the computing device 600 may be combined with other components in a mobile device, such as a mobile computing device 650. Each of such devices may contain one or more of the computing device 600 and the mobile computing device 650, and an entire system may be made up of multiple computing devices communicating with each other.

The mobile computing device 650 includes a processor 652; a memory 664; an input/output device, such as a display 654; a communication interface 666; and a transceiver 668; among other components. The mobile computing device 650 may also be provided with a storage device, such as a micro-drive or other device, to provide additional storage. Each of the processor 652, the memory 664, the display 654, the communication interface 666, and the transceiver 668, are interconnected using various buses, and several of the components may be mounted on a common motherboard or in other manners as appropriate. In some implementations, the mobile computing device 650 may include a camera device(s) (not shown).

The processor 652 can execute instructions within the mobile computing device 650, including instructions stored in the memory 664. The processor 652 may be implemented as a chipset of chips that include separate and multiple analog and digital processors. For example, the processor 652 may be a Complex Instruction Set Computers (CISC) processor, a Reduced Instruction Set Computer (RISC) processor, or a Minimal Instruction Set Computer (MISC) processor. The processor 652 may provide, for example, for coordination of the other components of the mobile computing device 650, such as control of user interfaces (UIs), applications run by the mobile computing device 650, and/or wireless communication by the mobile computing device 650.

The processor 652 may communicate with a user through a control interface 658 and a display interface 656 coupled to the display 654. The display 654 may be, for example, a Thin-Film-Transistor Liquid Crystal Display (TFT) display, an Organic Light Emitting Diode (OLED) display, or other appropriate display technology. The display interface 656 may include appropriate circuitry for driving the display 654 to present graphical and other information to a user. The control interface 658 may receive commands from a user and convert them for submission to the processor 652. In addition, an external interface 662 may provide communication with the processor 652, so as to enable near area communication of the mobile computing device 650 with other devices. The external interface 662 may provide, for example, for wired communication in some implementations, or for wireless communication in other implementations, and multiple interfaces may also be used.

The memory 664 stores information within the mobile computing device 650. The memory 664 can be implemented as one or more of a computer-readable medium or media, a volatile memory unit or units, or a non-volatile memory unit or units. An expansion memory 674 may also be provided and connected to the mobile computing device 650 through an expansion interface 672, which may include, for example, a Single in Line Memory Module (SIMM) card interface. The expansion memory 674 may provide extra storage space for the mobile computing device 650, or may also store applications or other information for the mobile computing device 650. Specifically, the expansion memory 674 may include instructions to carry out or supplement the processes described above, and may include secure information also. Thus, for example, the expansion memory 674 may be provided as a security module for the mobile computing device 650, and may be programmed with instructions that permit secure use of the mobile computing device 650. In addition, secure applications may be provided via the SIMM cards, along with additional information, such as placing identifying information on the SIMM card in a non-hackable manner.

The memory may include, for example, flash memory and/or non-volatile random access memory (NVRAM), as discussed below. In some implementations, instructions are stored in an information carrier. The instructions, when executed by one or more processing devices, such as processor 652, perform one or more methods, such as those described above. The instructions can also be stored by one or more storage devices, such as one or more computer-readable or machine-readable mediums, such as the memory 664, the expansion memory 674, or memory on the processor 652. In some implementations, the instructions can be received in a propagated signal, such as, over the transceiver 668 or the external interface 662.

The mobile computing device 650 may communicate wirelessly through the communication interface 666, which may include digital signal processing circuitry where necessary. The communication interface 666 may provide for communications under various modes or protocols, such as Global System for Mobile communications (GSM) voice calls, Short Message Service (SMS), Enhanced Messaging Service (EMS), Multimedia Messaging Service (MMS) messaging, code division multiple access (CDMA), time division multiple access (TDMA), Personal Digital Cellular (PDC), Wideband Code Division Multiple Access (WCDMA), CDMA2000, General Packet Radio Service (GPRS). Such communication may occur, for example, through the transceiver 668 using a radio frequency. In addition, short-range communication, such as using a Bluetooth or Wi-Fi, may occur. In addition, a Global Positioning System (GPS) receiver module 670 may provide additional navigation- and location-related wireless data to the mobile computing device 650, which may be used as appropriate by applications running on the mobile computing device 650.

The mobile computing device 650 may also communicate audibly using an audio codec 660, which may receive spoken information from a user and convert it to usable digital information. The audio codec 660 may likewise generate audible sound for a user, such as through a speaker, e.g., in a handset of the mobile computing device 650. Such sound may include sound from voice telephone calls, may include recorded sound (e.g., voice messages, music files, etc.) and may also include sound generated by applications operating on the mobile computing device 650.

The mobile computing device 650 may be implemented in a number of different forms, as shown in FIG. 6. For example, it may be implemented in the mobile device described with respect to FIGS. 1-3. Other implementations may include a phone device 682 and a tablet device 684. The mobile computing device 650 may also be implemented as a component of a smart-phone, personal digital assistant, AR device, or other similar mobile device.

Computing device 600 and/or 650 can also include USB flash drives. The USB flash drives may store operating systems and other applications. The USB flash drives can include input/output components, such as a wireless transmitter or USB connector that may be inserted into a USB port of another computing device.

A number of implementations have been described. Nevertheless, it will be understood that various modifications may be made without departing from the spirit and scope of the disclosure. For example, various forms of the flows shown above may be used, with steps re-ordered, added, or removed.

Embodiments of the subject matter and the actions and operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, e.g., one or more modules of computer program instructions, encoded on a computer program carrier, for execution by, or to control the operation of, data processing apparatus. The carrier may be a tangible non-transitory computer storage medium. Alternatively or in addition, the carrier may be an artificially-generated propagated signal, e.g., a machine-generated electrical, optical, or electromagnetic signal, that is generated to encode information for transmission to suitable receiver apparatus for execution by a data processing apparatus. The computer storage medium can be or be part of a machine-readable storage device, a machine-readable storage substrate, a random or serial access memory device, or a combination of one or more of them. A computer storage medium is not a propagated signal.

The term "data processing apparatus" encompasses all kinds of apparatus, devices, and machines for processing data, including by way of example a programmable processor, a computer, or multiple processors or computers. Data processing apparatus can include special-purpose logic circuitry, e.g., an FPGA (field programmable gate array), an ASIC (application-specific integrated circuit), or a GPU (graphics processing unit). The apparatus can also include, in addition to hardware, code that creates an execution environment for computer programs, e.g., code that constitutes processor firmware, a protocol stack, a database management system, an operating system, or a combination of one or more of them.

A computer program can be written in any form of programming language, including compiled or interpreted languages, or declarative or procedural languages; and it can be deployed on a system of one or more computers in any form, including as a stand-alone program, e.g., as an app, or as a module, component, engine, subroutine, or other unit suitable for executing in a computing environment, which environment may include one or more computers interconnected by a data communication network in one or more locations.

A computer program may, but need not, correspond to a file in a file system. A computer program can be stored in a portion of a file that holds other programs or data, e.g., one or more scripts stored in a markup language document, in a single file dedicated to the program in question, or in multiple coordinated files, e.g., files that store one or more modules, sub-programs, or portions of code.

The processes and logic flows described in this specification can be performed by one or more computers executing one or more computer programs to perform operations by operating on input data and generating output. The processes and logic flows can also be performed by special-purpose logic circuitry, e.g., an FPGA, an ASIC, or a GPU, or by a combination of special-purpose logic circuitry and one or more programmed computers.

Computers suitable for the execution of a computer program can be based on general or special-purpose microprocessors or both, or any other kind of central processing unit. Generally, a central processing unit will receive instructions and data from a read-only memory or a random access memory or both. The essential elements of a computer are a central processing unit for executing instructions and one or more memory devices for storing instructions and data. The central processing unit and the memory can be supplemented by, or incorporated in, special-purpose logic circuitry.

Generally, a computer will also include, or be operatively coupled to, one or more mass storage devices, and be configured to receive data from or transfer data to the mass storage devices. The mass storage devices can be, for example, magnetic, magneto-optical, or optical disks, or solid state drives. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

To provide for interaction with a user, embodiments of the subject matter described in this specification can be implemented on one or more computers having, or configured to communicate with, a display device, e.g., a LCD (liquid crystal display) or organic light-emitting diode (OLED) monitor, a virtual-reality (VR) or augmented-reality (AR) display, for displaying information to the user, and an input device by which the user can provide input to the computer, e.g., a keyboard and a pointing device, e.g., a mouse, a trackball or touchpad. Other kinds of devices can be used to provide for interaction with a user as well; for example, feedback and responses provided to the user can be any form of sensory feedback, e.g., visual, auditory, speech or tactile; and input from the user can be received in any form, including acoustic, speech, or tactile input, including touch motion or gestures, or kinetic motion or gestures or orientation motion or gestures. In addition, a computer can interact with a user by sending documents to and receiving documents from a device that is used by the user; for example, by sending web pages to a web browser on a user's device in response to requests received from the web browser, or by interacting with an app running on a user device, e.g., a smartphone or electronic tablet. Also, a computer can interact with a user by sending text messages or other forms of message to a personal device, e.g., a smartphone that is running a messaging application, and receiving responsive messages from the user in return.

This specification uses the term "configured to" in connection with systems, apparatus, and computer program components. That a system of one or more computers is configured to perform particular operations or actions means that the system has installed on it software, firmware, hardware, or a combination of them that in operation cause the system to perform the operations or actions. That one or more computer programs is configured to perform particular operations or actions means that the one or more programs include instructions that, when executed by data processing apparatus, cause the apparatus to perform the operations or actions. That special-purpose logic circuitry is configured to perform particular operations or actions means that the circuitry has electronic logic that performs the operations or actions.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of what is being claimed, which is defined by the claims themselves, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claim may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method comprising:

receiving, by at least one processing device, one or more messages exchanged between two internal nodes of a base station of an open radio access network (Open-RAN) through a fronthaul interface of the Open-RAN, the fronthaul interface being an interface between one or more radio units (RUs) and one or more distributed units (DUs) of the Open-RAN, wherein the one or more messages comprise enhanced common public radio interface (eCPRI) messages;

parsing, by the at least one processing device, a first data field of the eCPRI messages to identify an event type and a second data field to identify a fault indication or notification;

prioritizing the one or more messages by assigning a higher priority to messages where the event type indicates a fault indication compared to messages where the event type indicates a notification;

determining, by the at least one processing device based on the one or more messages, that an event affecting an operation status of the fronthaul interface has occurred based on a number of occurrences of the prioritized messages exceeding a threshold value within a specified time period;

determining, by the at least one processing device, one or more actions to account for the operation status of the fronthaul interface, the one or more actions comprising at least one of clearing an alarm on the fronthaul interface or resetting an eCPRI protocol supported by the fronthaul interface; and generating, by the at least one processing device, a signal configured to trigger the one or more actions.

2. The method of claim 1, wherein the base station is a gNodeB (gNB) of a 5G network or an eNodeB of a 4G network.

3. The method of claim 1, wherein the two internal nodes comprise an eCPRI Radio Equipment Control (eREC) node and an eCPRI Radio Equipment (eRE) node.

4. The method of claim 1, wherein determining the one or more actions to account for the operation status of the fronthaul interface comprises determining which of the one or more RUs or the one or more DUs is causing a fault, and triggering the one or more actions on the one or more RUs or the one or more DUs causing the fault.

5. The method of claim 1, wherein determining the one or more actions to account for the operation status of the fronthaul interface comprises predicting a disruption to the fronthaul interface, wherein the one or more actions comprise a proactive action before the predicted disruption.

6. A system comprising:

one or more processors; and one or more non-transitory storage devices storing instructions that are operable, when executed by the one or more processors, to cause the one or more processors to perform operations comprising:

receiving one or more messages exchanged between two internal nodes of a base station of an open radio access network (Open-RAN) through a fronthaul interface of the Open-RAN, the fronthaul interface being an interface between one or more radio units (RUs) and one or more distributed units (DUs) of the Open-RAN, wherein the one or more messages comprise enhanced common public radio interface (eCPRI) messages;

parsing a first data field of the eCPRI messages to identify an event type and a second data field to identify a fault indication or notification;

prioritizing the one or more messages by assigning a higher priority to messages where the event type indicates a fault indication compared to messages where the event type indicates a notification;

determining, based on the one or more messages, that an event affecting an operation status of the fronthaul interface has occurred based on a number of occurrences of the prioritized messages exceeding a threshold value within a specified time period;

determining one or more actions to account for the operation status of the fronthaul interface, the one or more actions comprising at least one of clearing an alarm on the fronthaul interface or resetting an eCPRI protocol supported by the fronthaul interface; and generating a signal configured to trigger the one or more actions.

7. The system of claim 6, wherein the base station is a gNodeB (gNB) of a 5G network or an eNodeB of a 4G network.

8. The system of claim 6, wherein the two internal nodes comprise an eCPRI Radio Equipment Control (eREC) node and an eCPRI Radio Equipment (eRE) node.

9. The system of claim 6, wherein determining the one or more actions to account for the operation status of the fronthaul interface comprises determining which of the one or more RUs or the one or more DUs is causing a fault, and triggering the one or more actions on the one or more RUs or the one or more DUs causing the fault.

10. The system of claim 6, wherein determining the one or more actions to account for the operation status of the fronthaul interface comprises predicting a disruption to the fronthaul interface, wherein the one or more actions comprise a proactive action before the predicted disruption.

11. One or more non-transitory computer storage media encoded with computer program instructions that when executed by one or more computers cause the one or more computers to perform operations comprising:

receiving one or more messages exchanged between two internal nodes of a base station of an open radio access network (Open-RAN) through a fronthaul interface of the Open-RAN, the fronthaul interface being an interface between one or more radio units (RUs) and one or more distributed units (DUs) of the Open-RAN, wherein the one or more messages comprise enhanced common public radio interface (eCPRI) messages;

parsing a first data field of the eCPRI messages to identify an event type and a second data field to identify a fault indication or notification;

prioritizing the one or more messages by assigning a higher priority to messages where the event type indicates a fault indication compared to messages where the event type indicates a notification;

determining, based on the one or more messages, that an event affecting an operation status of the fronthaul interface has occurred based on a number of occurrences of the prioritized messages exceeding a threshold value within a specified time period;

determining one or more actions to account for the operation status of the fronthaul interface, the one or more actions comprising at least one of clearing an alarm on the fronthaul interface or resetting an eCPRI protocol supported by the fronthaul interface; and generating a signal configured to trigger the one or more actions.

12. The one or more non-transitory computer storage media of claim 11, wherein the base station is a gNodeB (gNB) of a 5G network or an eNodeB of a 4G network.

13. The one or more non-transitory computer storage media of claim 11, wherein the two internal nodes comprise an eCPRI Radio Equipment Control (eREC) node and an eCPRI Radio Equipment (eRE) node.

14. The one or more non-transitory computer storage media of claim 11, wherein determining the one or more actions to account for the operation status of the fronthaul interface comprises determining which of the one or more RUs or the one or more DUs is causing a fault, and triggering the one or more actions on the one or more RUs or the one or more DUs causing the fault.

15. The one or more non-transitory computer storage media of claim 11, wherein determining the one or more actions to account for the operation status of the fronthaul interface comprises predicting a disruption to the fronthaul interface, wherein the one or more actions comprise a proactive action before the predicted disruption.

* * * * *